United States Patent [19]

Bach et al.

[11] Patent Number: 5,312,926
[45] Date of Patent: May 17, 1994

[54] INDONAPHTHOL DYES AND THERMAL TRANSFER THEREOF

[75] Inventors: Volker Bach, Neustadt; Karl-Heinz Etzbach, Frankenthal; Ruediger Sens, Mannheim, all of Fed. Rep. of Germany

[73] Assignee: BASF Aktiengesellschaft, Ludwigshafen, Fed. Rep. of Germany

[21] Appl. No.: 677,291

[22] Filed: Mar. 29, 1991

[30] Foreign Application Priority Data

Mar. 30, 1990 [DE] Fed. Rep. of Germany ....... 4010269

[51] Int. Cl.$^5$ ............................................. C07D 277/46
[52] U.S. Cl. ..................................... 548/195; 548/133; 548/139; 548/143; 548/128; 548/214; 548/371.7
[58] Field of Search ................ 548/195, 139, 371.7

[56] References Cited

U.S. PATENT DOCUMENTS

| | | | |
|---|---|---|---|
| 4,769,360 | 9/1988 | Evans et al. | 503/227 |
| 4,923,638 | 5/1990 | Ohno | 252/587 |
| 4,975,409 | 12/1990 | Mikoshiba et al. | 503/227 |

FOREIGN PATENT DOCUMENTS

| | | |
|---|---|---|
| 0111004 | 6/1984 | European Pat. Off. . |
| 0133011 | 2/1985 | European Pat. Off. . |
| 0133012 | 2/1985 | European Pat. Off. . |
| 0192435 | 8/1986 | European Pat. Off. . |
| 0216483 | 4/1987 | European Pat. Off. . |
| 0227092 | 7/1987 | European Pat. Off. . |
| 0227094 | 7/1987 | European Pat. Off. . |
| 0227095 | 7/1987 | European Pat. Off. . |
| 3524519 | 1/1986 | Fed. Rep. of Germany . |
| 62-181381 | 8/1987 | Japan . |
| 63-179793 | 7/1988 | Japan . |
| 63-179793 | 7/1988 | Japan . |

OTHER PUBLICATIONS

Japan Abstracts, JP-A-61 199-997, Sep. 4, 1986.
Japan Abstracts, JP-A-61 283-595, Dec. 13, 1986.
Japan Abstracts, JP-A-61 237-694, Oct. 22, 1986.
Japan Abstracts, 105:235937m, & JP-61,127,392, Jun. 14, 1986.

Primary Examiner—Robert Gerstl
Attorney, Agent, or Firm—Oblon, Spivak, McClelland, Maier & Neustadt

[57] ABSTRACT

Indonaphthol thermal transfer dyes have the formula

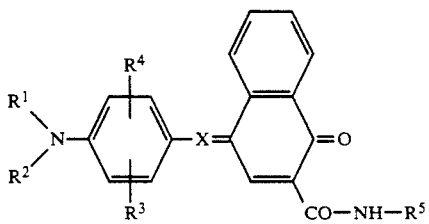

where
X is nitrogen or the radical CH,
$R^1$ and $R^2$ are each independently of the other $C_1$-$C_6$-alkyl, which may be substituted, $C_1$-$C_6$-monooxaalkyl or -dioxaalkyl or allyl,
$R^3$ and $R^4$ are each independently of the other hydrogen, $C_1$-$C_4$-alkyl, $C_1$-$C_4$-alkoxy or $C_1$-$C_4$-alkanoylamino, and
$R^5$ is five-membered hetaryl which is not benzofused and has two or more hetero atoms, with the proviso that $R^1$ and $R^2$ are not both unsubstituted $C_1$-$C_6$-alkyl at one and the same time.

7 Claims, No Drawings

INDONAPHTHOL DYES AND THERMAL TRANSFER THEREOF

The present invention relates to novel indonaphthol dyes of the formula I

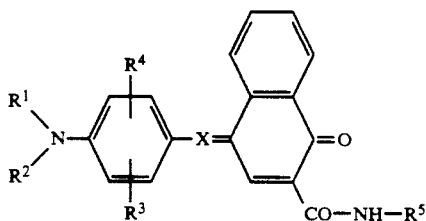

where
X is nitrogen or the radical CH,
$R^1$ and $R^2$ are each independently of the other $C_1$–$C_6$-alkyl, which may be substituted, $C_1$–$C_6$-monooxaalkyl or -dioxaalkyl or allyl,
$R^3$ and $R^4$ are each independently of the other hydrogen, $C_1$–$C_4$-alkyl, $C_1$–$C_4$-alkoxy or $C_1$–$C_4$-alkanoylamino, and
$R^5$ is five-membered hetaryl which is not benzofused and has two or more hetero atoms selected from the group consisting of nitrogen, oxygen and sulfur,
with the proviso that $R^1$ and $R^2$ are not both unsubstituted $C_1$–$C_6$-alkyl at one and the same time, and to a process for thermal transfer thereof.

U.S. Pat. No. 4,769,360 discloses indonaphthol dyes in which a 2-benzoxazolyl radical is bonded to the naphthalene ring via a sulfur atom.

Furthermore, JP-A-179,793/1988 describes an indonaphthol dye which has inter alia an N-ethyl-N-(2-methyloulfonylethyl)amino group and possesses 4-nitro-2-thienyl as heterocyclic radical.

It is an object of the present invention to provide new indonaphthol dyes which have advantageous application properties.

We have found that this object is achieved by the indonaphthol dyes of the formula I defined at the beginning.

Any alkyl appearing in the abovementioned formula I may be either straight-chain or branched.

Any substituted alkyl appearing in the abovementioned formula I may have as substituents for example phenyl, cyano, $C_1$–$C_6$-alkanoyloxy, $C_1$–$C_4$-alkoxycarbonyl or $C_1$–$C_4$-alkoxycarbonyloxy, of which the last example may in turn be substituted in the alkoxy group by phenyl or $C_1$–$C_4$-alkoxy.

Suitable radicals $R^1$ and $R^2$ are for example methyl, ethyl, propyl, isopropyl, butyl, isobutyl, secbutyl, pentyl, isopentyl, neopentyl, tert-pentyl, hexyl, 2-methylpentyl, benzyl, 1- or 2-phenylethyl, 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-methoxycarbonylethyl, 2- or 3-methoxycarbonylpropyl, 2-ethoxycarbonylethyl, 2- or 3-ethoxycarbonylpropyl, 2-methoxycarbonyloxyethyl, 2- or 3-methoxycarbonyloxypropyl, 2-ethoxycarbonyloxyethyl, 2- or 3-ethoxycarbonyloxypropyl, 2-butoxycarbonyloxyethyl, 2- or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl, 2- or 3-(2-ethoxyethoxycarbonyloxy)propyl, 2-methoxyethyl, 2- or 3-methoxypropyl, 2-ethoxyethyl, 2- or 3-ethoxypropyl, 2-propoxyethyl, 2- or 3-propoxypropyl, 2-isopropoxyethyl, 2- or 3-isopropoxypropyl, 2-butoxyethyl, 2- or 3-butoxypropyl, 3,6-dioxaheptyl or 3,6-dioxaoctyl.

$R^5$ is derived from a five-membered aromatic heterocyclic radical which is not benzofused and has two or more hetero atoms selected from the group consisting of nitrogen, oxygen and sulfur.

Suitable heterocyclic structures (which may be substituted) from which $R^5$ is derived are for example pyrazole, imidazole, oxazole, isoxazole, thiazole, isothiazole, 1,2,4-triazole, 1,2,4-oxadiazole, 1,3,4-oxadiazole, 1,2,4-thiadiazole or 1,3,4-thiadiazole.

Emphasis must here be given to heterocycles of the pyrazole, thiazole, isothiazole, 1,2,4-oxadiazole, 1,3,4-oxadiazole, 1,2,4-thiadiazole or 1,3,4-thiadiazole series.

Of particular importance here are the radicals

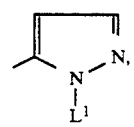

(IIa)

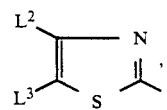

(IIb)

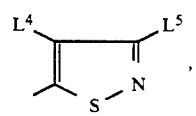

(IIc)

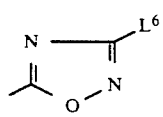

(IId)

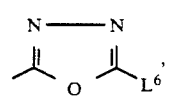

(IIe)

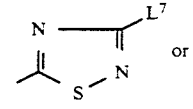

(IIf)

or

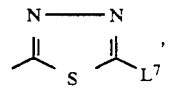

(IIg)

where
$L^1$ is $C_1$–$C_8$-alkyl or cyclohexyl,
$L^2$ is hydrogen, chlorine, $C_1$–$C_8$-alkyl, $C_1$–$C_8$-oxaalkyl, $C_1$–$C_8$-alkoxy or $C_1$–$C_8$-alkoxycarbonyl, where the alkyl group may be interrupted by 1 or 2 oxygen atoms in ether function,
$L^3$ is hydrogen, $C_1$–$C_8$-alkyl, cyano, nitro or $C_1$–$C_8$-alkoxycarbonyl, where the alkyl group may be interrupted by 1 or 2 oxygen atoms in ether function,
$L^4$ is hydrogen, chlorine, cyano, nitro or $C_1$–$C_8$-alkoxycarbonyl, where the alkyl group may be interrupted by 1 or 2 oxygen atoms in ether function, $L^5$ is chlorine, $C_1$-$C_8$-alkyl, $C_1$-$C_8$-oxaalkyl, $C_1$-$C_8$-alkoxy or $C_1$-$C_8$-alkylthio, $L^6$ is $C_1$-$C_8$-alkyl, and $L^7$ is hydrogen, chlorine, cyano, thiocyanato, $C_1$-$C_8$-alkyl, $C_1$-$C_8$-oxaalkyl, $C_1$-$C_8$-alkoxy, $C_1$-$C_8$-alkylthio, 2-($C_1$-$C_2$-alkoxycarbonyl)ethylthio or $C_1$-$C_8$-alkoxycarbonyl, where the alkyl group may be interrupted by 1 or 2 oxygen atoms in ether function.

Examples of $L^1$, $L^2$, $L^3$, $L^4$, $L^5$, $L^6$ and $L^7$ are methyl, ethyl, propyl, isopropyl, butyl, isobutyl, secbutyl, pentyl, isopentyl, neopentyl, tert-pentyl, hexyl, 2-methylpentyl, heptyl, octyl and 2-ethylhexyl.

$L^2$, $L^4$ and $L^7$ may each also be for example 2-methoxyethyl, 2- or 3-methoxypropyl, 2-ethoxyethyl, 2- or 3-ethoxypropyl, methoxy, ethoxy, propoxy, isopropoxy, butoxy, isobutoxy, sec-butoxy, pentyloxy, isopentyloxy, neopentyloxy, hexyloxy, heptyloxy, octyloxy or 2-ethylhexyloxy.

$L^4$ and $L^7$ may each also be for example methylthio, ethylthio, propylthio, isopropylthio, butylthio, isobutythio, pentylthio, hexylthio, heptylthio, octylthio or 2-ethylhexylthio.

$L^2$, $L^3$, $L^5$ and $L^7$ may each also be for example methoxycarbonyl, ethoxycarbonyl, propoxycarbonyl, isopropoxycarbonyl, butoxycarbonyl, 2-methoxyethoxycarbonyl, 2-ethoxyethoxycarbonyl, 3,6-dioxaheptyloxycarbonyl or 3,6-dioxaoctyloxycarbonyl.

$L^7$ may also be for example 2-methoxycarbonylethylthio or 2-ethoxycarbonylethylthio.

Preference is given to indonaphthol dyes of the formula I where X is nitrogen.

Preference is further given to indonaphthol dyes of the formula I where $R^1$ and $R^2$ are each independently of the other $C_1$-$C_4$-alkyl, which may be substituted by cyano, $C_2$-$C_5$-alkanoyloxy or $C_1$-$C_2$-alkoxycarbonyloxy and/or interrupted by 1 oxygen atom in ether function.

Preference is further given to indonaphthol dyes of the formula I where $R^3$ and $R^4$ are both hydrogen.

Particular preference is given to indonaphthol dyes of the formula I where $R^5$ is a radical of the formula IIa, IIb or IIg, in particular such a radical where $L^1$ is $C_1$-$C_4$-alkyl or cyclohexyl, $L^2$ is hydrogen or $C_1$-$C_4$-alkyl, $L^3$ is hydrogen and $L^7$ is $C_1$-$C_4$-alkyl.

The indonaphthol dyes of the formula I according to the present invention can be prepared in a conventional manner.

For instance, by condensing a nitroso compound of the formula IIIa or a carbonyl compound of the formula IIIb

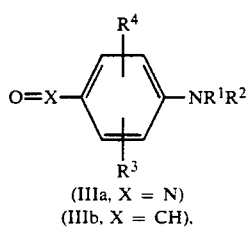

(IIIa, X = N)
(IIIb, X = CH).

where $R^1$, $R^2$, $R^3$ and $R^4$ are each as defined above, with a naphthol compound of the formula IV

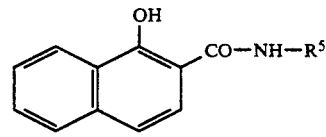

where $R^5$ is as defined above (see for example DE-A-3 716 656).

It is also possible to couple p-phenylenediamines of the formula V

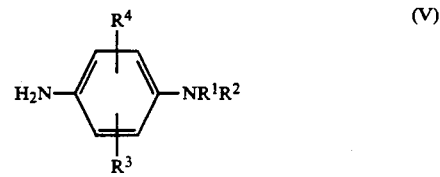

where $R^1$, $R^2$, $R^3$ and $R^4$ are each as defined above, with the naphthol compounds of the formula IV under oxidative conditions (see for example U.S. Pat. No. 4,695,287).

It is a further object of the present invention to provide a new process for the thermal transfer of dyes.

In the thermotransfer printing process, a transfer sheet which contains a thermally transferable dye in one or more binders on a support, with or without suitable assistants, is heated from the back with an energy source, for example a thermal printing head, in short pulses (lasting fractions of a second), causing the dye to migrate out of the transfer sheet and to diffuse into the surface coating of a receiving medium. The essential advantage of this process is that the amount of dye to be transferred (and hence the color gradation) is readily controllable through adjustment of the energy to be emitted by the energy source.

In general, color recording is carried out using the three subtractive primaries yellow, magenta and cyan (with or without black). To ensure optimal color recording, the dyes must have the following properties:

ready thermal transferability, little tendency to migrate within or out of the surface coating of the receiving medium at room temperature, high thermal and photochemical stability and resistance to moisture and chemical substances, suitable hues for subtractive color mixing, a high molar absorption coefficient, no tendency to crystallize out on storage of the transfer sheet.

From experience these requirements are very difficult to meet at one and the same time.

For this reason, most of the existing thermal transfer printing dyes do not meet the required property profile.

We have found that the further object is achieved advantageously by a process for transferring an indonaphthol dye from a transfer to a sheet of plastic-coated paper with the aid of an energy source, which comprises using a transfer on which there is or are one or more indonaphthol dyes of the formula I

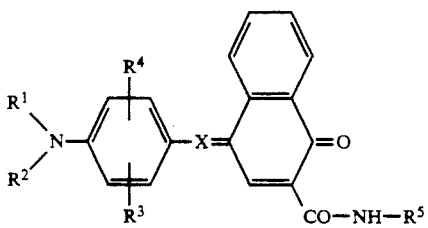

where

X is nitrogen or the radical CH, $R^1$ and $R^2$ are each independently of the other $C_1$–$C_6$-alkyl, which may be substituted, $C_1$–$C_6$-monooxaalkyl or -dioxaalkyl or allyl, $R^3$ and $R^4$ are each independently of the other hydrogen, $C_1$–$C_4$-alkyl, $C_1$–$C_4$-alkoxy or $C_1$–$C_4$-alkanoylamino, and $R^5$ is five-membered hetaryl which is not benzofused and has two or more hetero atoms selected from the group consisting of nitrogen, oxygen and sulfur, with the proviso that $R^1$ and $R^2$ are not both unsubstituted $C_1$–$C_6$-alkyl at one and the same time.

Compared with the dyes used in existing processes, the dyes transferred in the process according to the invention are notable in general for high resistance to migration in the print and for good light fastness.

Owing to their high molar extinction coefficients and their high brilliance, the dyes of the formula I employed in the novel process are advantageously suitable for preparing a trichromatic system as required for subtractive color mixing.

Blending with triazolopyridine dyes as described in earlier European Patent Application No. 90116436.8 produces a high purity of hue and, in appropriate trichromatic systems, an improvement in the black prints.

To prepare the dye transfers required in the process according to the present invention, the dyes are incorporated into a suitable organic solvent or solvent mixture together with one or more binders and possibly further assistants to form a printing ink in which the dye is preferably present in a molecularly dispersed, i.e. dissolved, form. The printing ink can then be applied to an inert support by knife coating and dried in air.

Suitable organic solvents for the dyes I are for example those in which the solubility of the dyes I at 20° C. is greater than 1% by weight, preferably greater than 5% by weight.

Examples are ethanol, propanol, isobutanol, tetrahydrofuran, methylene chloride, methyl ethyl ketone, cyclopentanone, cyclohexanone, toluene, chlorobenzene and mixtures thereof.

Suitable binders are all resins or polymer materials which are soluble in organic solvents and are capable of binding the dye to the inert support in a form in which it will not rub off. Preference is given to those binders which, after the printing ink has dried in air, hold the dye in a clear, transparent film in which no visible crystallization of the dye occurs.

Examples of such binders are cellulose derivatives, e.g. methylcellulose, ethylcellulose, ethylhydroxyethylcellulose, hydroxypropylcellulose, cellulose acetate and cellulose acetobutyrate, starch, alginates, alkyd resins, vinyl resins, polyvinyl alcohol, polyvinyl acetate, polyvinyl butyrate and polyvinylpyrrolidones. It is also possible to use polymers and copolymers of acrylates or derivatives thereof, such as polyacrylic acid, poly-methyl methacrylate or styrene/acrylate copolymers, polyester resins, polyamide resins, polyurethane resins or natural CH resins, such as gum arabic. Other suitable binders are described for example in DE-A-3,524,519.

Preferred binders are ethylcellulose, ethylhydroxyethylcellulose, polyvinyl butyrate and polyvinyl acetate.

The weight ratio of binder:dye is in general within the range from 1:1 to 10:1.

Suitable assistants are for example release agents as mentioned in EP-A-227,092, EP-A-192,435 and the patent applications cited therein. It is also possible to include in particular organic additives which prevent the transfer dyes from crystallizing out in the course of storage and heating of the inked ribbon, for example cholesterol or vanillin.

Inert support materials are for example tissue, blotting or parchment paper and plastics films possessing good heat resistance, for example metallized or unmetallized polyester, polyamide or polyamide. The inert support may additionally be coated on the side facing the energy source with a lubricant or slipping layer in order that adhesion of the energy source to the support material may be prevented. Suitable lubricants are described for example in EP-A-216,483 and EP-A-227,095. The thickness of the support is in general from 3 to 30 μm, preferably from 5 to 10 μm.

The dye-receiving layer can be basically any heat resistant plastics layer having affinity for the dyes to be transferred, for example a modified polycarbonate or polyester. Suitable recipes for the receiving layer composition are described in detail for example in EP-A-227,094, EP-A-133,012, EP-A-133,011, EP-A-111,004, JP-A-199,997/1986, JP-A-283,595/1986, JP-A-237,694/1986 and JP-A-127,392/1986.

Transfer is effected by means of an energy source, for example a laser or a thermal printing head, which must be heatable to >300° C. in order that dye transfer may take place within the time range t: 0<t<15 msec. In the course of transfer, the dye migrates out of the transfer sheet and diffuses into the surface coating of the receiving medium.

The dyes according to the present invention are also advantageous for coloring synthetic materials, for example polyesters, polyamides or polycarbonates.

The Examples which follow further illustrate the present invention. Percentages are by weight, unless otherwise stated.

PREPARATION OF DYES

EXAMPLE 1

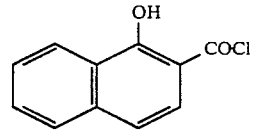

a)

24.1 g of 1-hydroxynaphthalene-2-carboxylic acid were suspended in 67 ml of thionyl chloride. The mixture was heated to the reflux temperature, kept at that temperature for 5 hours and, after cooling down to room temperature, stirred into 0.5 l of petroleum ether. The 1-hydroxynaphthalene-2-carbonyl chloride precipitate was filtered off with suction, washed with petroleum ether and dried.

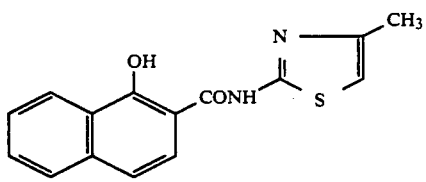
b)

26.4 g of this acid chloride were dissolved in 100 ml of methylene chloride and added dropwise to a solution of 14.6 g of 2-amino-4-methylthiazole, 22 ml of triethylamine and catalytic amounts of dimethylaminopyridine in 100 ml of methylene chloride at 0°–5° C. Stirring was then continued at room temperature until the reaction had ended (check by TLC), then the mixture was stirred into 1 l of acetone and the precipitate was filtered off with suction. The residue was suspended in water, the suspension was adjusted with hydrochloric acid to pH 6–7 and filtered with suction, and the filter residue was washed with water ($R_f$ (5:1 v/v toluene-/ethyl acetate): 0.24).

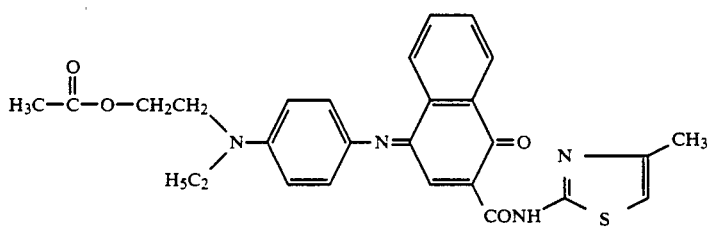

5.6 g of N-(2-acetoxyethyl)-N-ethylaniline were nitrosated with sodium nitrite in a conventional manner in a hydrochloric acid solution. The nitroso compound formed was taken up in methylene chloride, the mixture was added to a solution of 5.7 g of the naphtholamide (b) in 50 ml of methylene chloride and 50 ml of acetic anhydride, and the reaction mixture was stirred at room temperature until the reaction had ended (check by TLC). 100 ml of water were then added, and the mixture was heated at 40° C. for 1 hour. After cooling down to room temperature, the organic phase was separated off and washed with water, and the solvent was removed under reduced pressure. The dye was dissolved in N,N-dimethylformamide, precipitated with water, filtered off with suction, dried under reduced pressure at 50° C. and chromatographed over silica gel (with 5:1 v/v toluene/ethyl acetate; $R_f$ 0.37); $\lambda_{max}$ (measured in methylene chloride): 683 nm.

The same method was used to obtain the dyes of the formula

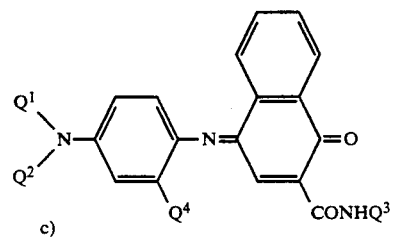
c)

(Exs. 1–31: $Q^4$ = H
Exs. 32–34: $Q^4$ = $CH_3$)

listed below in Table 1.

TABLE 1

| Ex. No. | $Q^1$ | $Q^2$ | $Q^3$ | $R_f$-value | $\lambda_{max}$ [nm] |
|---|---|---|---|---|---|
| 2 | $CH_3-\overset{O}{\underset{\|}{C}}-O-C_2H_4$ | $C_2H_5$ | (N, S heterocycle) | 0.21[a] | 684[f] |
| 3 | $CH_3-\overset{O}{\underset{\|}{C}}-O-C_2H_4$ | $C_2H_5$ | (N—N, S, $C_2H_5$ heterocycle) | 0.73[b] | 689[f] |
| 4 | $CH_3-\overset{O}{\underset{\|}{C}}-O-C_2H_4$ | $C_2H_5$ | (N, N, $C_2H_5$ heterocycle) | 0.65[b] | 675[f] |
| 5 | $NC-C_2H_4$ | $(CH_3)_2CH-\overset{O}{\underset{\|}{C}}-O-C_2H_4$ | (N, S, $CH_3$ heterocycle) | 0.58[b] | 666[g] |
| 6 | $NC-C_2H_4$ | $NC-C_2H_4$ | (N, S, $CH_3$ heterocycle) | 0.61[b] | 637[g] |

TABLE 1-continued
| Ex. No. | Q¹ | Q² | Q³ | $R_f$-value | $\lambda_{max}$ [nm] |
|---|---|---|---|---|---|
| 7 | H₉C₄—O—C₂H₄ | C₄H₉ |  | 0.84[b] | 699[g] |
| 8 | 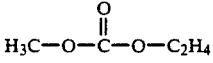 H₃C—O—C(=O)—O—C₂H₄ | C₂H₅ | 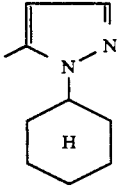 | 0.77[b] | 672[g] |
| 9 | 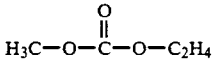 H₃C—O—C(=O)—O—C₂H₄ | C₂H₅ | 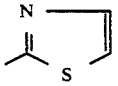 | 0.83[b] | 683[g] |
| 10 | 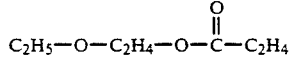 C₂H₅—O—C₂H₄—O—C(=O)—C₂H₄ | C₆H₅CH₂ |  | 0.33[a] | |
| 11 | 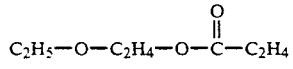 C₂H₅—O—C₂H₄—O—C(=O)—C₂H₄ | C₆H₅CH₂ | 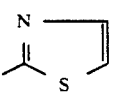 | 0.25[a] | 669[g] |
| 12 | 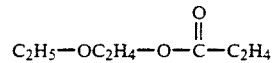 C₂H₅—OC₂H₄—O—C(=O)—C₂H₄ | C₆H₅CH₂ | 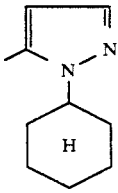 | 0.15[a] | 661[g] |
| 13 | NC—C₂H₄ | C₂H₅ | 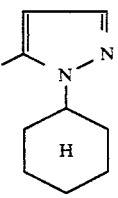 | 0.12[a] | 654[f] |
| 14 | 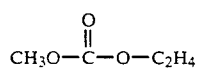 CH₃O—C(=O)—O—C₂H₄ | NC—C₂H₄ | 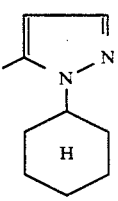 | 0.82[b] | 640[g] |
| 15 | NC—C₂H₄ | NC—C₂H₄ | 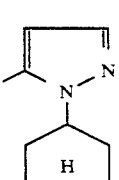 | 0.26[c] | 614[f] |
| 16 | NC—C₂H₄ | 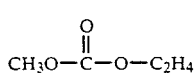 CH₃O—C(=O)—O—C₂H₄ |  | 0.27[b] | 673[g] |

TABLE 1-continued

| Ex. No. | Q¹ | Q² | Q³ | $R_f$-value | $\lambda_{max}$ [nm] |
|---|---|---|---|---|---|
| 17 | NC—C₂H₄ | NC—C₂H₄ | 4-methyl-2-methylidene-2,5-dihydrothiazole | 0.61[b] | 637[g] |
| 18 | C₆H₅C₂H₄—O—C(=O)—OC₂H₄ | CH₃ | 4-methyl-2-methylidene-2,5-dihydrothiazole | 0.36[a] | 672[f] |
| 19 | NC—C₂H₄ | C₂H₅ | 4-methyl-2-methylidene-2,5-dihydrothiazole | 0.31[a] | 660[f] |
| 20 | CH₃—C(=O)—O—C₂H₄ | C₂H₅ | 1-ethyl-5-methylidene-4,5-dihydropyrazole | 0.60[b] | 675[f] |
| 21 | CH₃O—C(=O)—O—C₂H₄ | C₂H₅ | 1-cyclohexyl-5-methylidene-4,5-dihydropyrazole | 0.51[d] | 675[f] |
| 22 | NC—C₂H₄ | C₄H₉ | 1-cyclohexyl-5-methylidene-4,5-dihydropyrazole | 0.67[d] | 652[f] |
| 23 | C₆H₅C₂H₄O—C(=O)—O—C₂H₄ | CH₃ | 1-cyclohexyl-5-methylidene-4,5-dihydropyrazole | 0.19[a] | 666[f] |
| 24 | CH₃—C(=O)—O—C₂H₄ | C₂H₅ | 4-methyl-2-methylidene-2,5-dihydrothiazole | 0.37[a] | 683[f] |
| 25 | CH₃—C(=O)—O—C₂H₄ | C₂H₅ | 5-ethyl-2-methylidene-1,3,4-thiadiazole | 0.70[b] | 689[f] |
| 26 | C₄H₉OC₂H₄ | C₄H₉ | 4-methyl-2-methylidene-2,5-dihydrothiazole | 0.84[b] | 699[f] |
| 27 | CH₃—C(=O)—O—C₂H₄ | C₂H₅ | 2-methylidene-2,5-dihydrothiazole | 0.30[a] | 684[f] |

TABLE 1-continued

| Ex. No. | Q¹ | Q² | Q³ | $R_f$ value | $\lambda_{max}$ [nm] |
|---|---|---|---|---|---|
| 28 | NC—C₂H₄ | NC—C₂H₄ | ![thiazole ring with N, S] | 0.76[b] | 621[f] |
| 29 | NC—C₂H₄ | C₄H₉ | ![thiazole ring with N, S] | 0.36[a] | 663[f] |
| 30 | NC—C₂H₄ | C₂H₅ | ![thiazole ring with N, S] | 0.26[e] | 660[f] |
| 31 | CH₃—O—C(=O)—O—C₂H₄ | NC—C₂H₄ | ![thiazole ring with N, S] | 0.83[b] | 638[f] |
| 32 | NC—C₂H₄ | NC—C₂H₄ | ![thiazole ring with N, S] | 0.77[b] | |
| 33 | NC—C₂H₄ | NC—C₂H₄ | ![thiazole ring with N, S, CH₃] | 0.39[c] | 640[f] |
| 34 | NC—C₂H₄ | NC—C₂H₄ | ![pyrazole ring with N–N, cyclohexyl, H] | 0.61[b] | 652[g] |

[a] Mobile phase: 5:1 v/v toluene/ethyl acetate
[b] Mobile phase: ethyl acetate
[c] Mobile phase: 3:2 v/v toluene/ethyl acetate
[d] Mobile phase: 1:1 v/v toluene/ethyl acetate
[e] Mobile phase: 10:1 v/v toluene/ethyl acetate
[f] Measured in methylene chloride
[g] Measured in acetone

TRANSFER OF DYES

For a simple quantitative examination of the transfer characteristics of the dyes, the thermal transfer was effected with large hotplates instead of a thermal printing head, the transfer temperature being varied within the range 70° C.<T<120° C. while the transfer time was fixed at 2 minutes.

α) General recipe for coating the support with dye: 1 g of binder was dissolved in 8 ml of 8:2 v/v toluene/ethanol at 40°–50° C. A solution of 0.25 g of dye in 5 ml of tetrahydrofuran was added with stirring, and any insolubles were filtered off. The print paste thus obtained was applied with an 80 μm doctor blade to a polyester sheet (thickness: 6–10 μm) and dried with a hairdryer.

β) Testing of thermal transferability The dyes used were tested as follows: The polyester sheet donor containing the dye under test in the coated front was placed face down on commercial receptor paper (specified hereinafter) and pressed down. Donor/receptor were then wrapped in aluminum foil and heated between two hotplates at various temperatures T (within the temperature range 70° C.<T<120° C.). The amount of dye diffusing into the bright plastics layer of the receptor is proportional to the optical density (=absorbance A). The latter was determined photometrically. A plot of the logarithm of the absorbance A of the colored receptor papers measured within the temperature range from 80° to 110° C. against the reciprocal of the corresponding absolute temperature is a straight line from whose slope it is possible to calculate the activation energy $\Delta E_T$ for the transfer experiment:

$$\Delta E_T = 2.3 \cdot R \cdot \frac{\Delta \log A}{\Delta \left[\frac{1}{T}\right]}$$

To complete the characterization, it was additionally possible to read from the plots the temperature T* [°C.] at which the absorbance A of the colored receptor papers attains the value 1.

The dyes listed below in Table 2 were processed according to α), and the dye-coated transfers obtained were tested in respect of their transfer characteristics according to β). The table shows in each case the thermal transfer parameters T* and $\Delta E_T$ and the weight ratio of dye:binder.

The key to the abbreviations is as follows:
D=dye
B=binder (EC=ethylcellulose)
VYC=Hitachi VY-C Paper (receptor)
VYSX=Hitachi VY-SX Paper (receptor)
HCVPP=Hitachi HCVPP Paper (receptor)
PC=Kodak Color Video Print Paper (receptor)

TABLE 2

| Ex. No. | Dye No. | B | D:B | $\Delta E_T$ [kJ/mol] | T* [°C.] | receptor |
|---|---|---|---|---|---|---|
| 35 | 1 | EC | 1:2 | 90 | 99 | VYC |
| 36 | 2 | EC | 1:2 | 97 | 112 | VYC |
| 37 | 3 | EC | 1:2 | 40 | 106 | VYSX |
| 38 | 4 | EC | 1:2 | 77 | 124 | VYC |
| 39 | 7 | EC | 1:2 | 69 | 99 | VYC |
| 40 | 20 | EC | 1:2 | 77 | 124 | VYC |
| 41 | 21 | EC | 1:2 | 81 | 119 | VYC |
| 42 | 22 | EC | 1:2 | 90 | 123 | VYC |
| 43 | 23 | EC | 1:2 | 96 | 103 | HCVPP |
| 44 | 23 | EC | 1:2 | 88 | 105 | VYC |
| 45 | 24 | EC | 1:2 | 90 | 99 | VYC |
| 46 | 24 | EC | 1:2 | 108 | 97 | PC |
| 47 | 25 | EC | 1:2 | 40 | 106 | VYSX |
| 48 | 26 | EC | 1:2 | 69 | 99 | VYC |
| 49 | 27 | EC | 1:2 | 97 | 112 | VYC |
| 50 | 28 | EC | 1:2 | 75 | 136 | PC |
| 51 | 29 | EC | 1:2 | 86 | 121 | VYC |
| 52 | 30 | EC | 1:2 | 77 | 126 | VYC |
| 53 | 31 | EC | 1:2 | 87 | 132 | VYC |

We claim:

1. An indonaphthol dye of the formula I

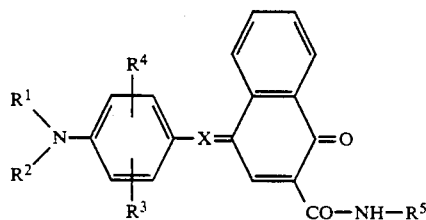

(I)

where

X is nitrogen or the radical CH, $R^1$ and $R^2$ are each independently of the other $C_1$-$C_6$-alkyl which may be substituted with phenyl, cyano, $C_1$-$C_6$-alkanoyloxy, $C_1$-$C_4$-alkoxycarbonyl or $C_1$-$C_4$-alkoxycarbonyloxy wherein said $C_1$-$C_4$ alkoxycarbonyloxy may itself be substituted in the alkoxy group by phenyl or $C_1$-$C_4$-alkoxy, $C_1$-$C_6$-monooxaalkyl or -dioxaalkyl or allyl, $R^3$ and $R^4$ are each hydrogen, and $R^5$ is five-membered hetaryl which is not benzofused and has two or more hetero atoms selected from the group consisting of nitrogen, oxygen and sulfur, with the proviso that $R^1$ and $R^2$ are not both unsubstituted $C_1$-$C_6$-alkyl at one and the same time.

2. An indonaphthol dye as claimed in claim 1, where X is nitrogen.

3. An indonaphthol dye as claimed in claim 1, where X is the radical CH.

4. An indonaphthol dye as claimed in claim 1, wherein $R^1$ and $R^2$ are selected from the group consisting of methyl, ethyl, propyl, isopropyl, butyl, isobutyl, secbutyl, pentyl, isopentyl, neopentyl, tert-pentyl, hexyl, 2-methylpentyl, benzyl, 1- or 2-phenylethyl, 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-methoxycarbonylethyl, 2- or 3-methoxycarbonylpropyl, 2-ethoxycarbonylethyl, 2- or 3-ethoxycarbonylpropyl, 2-methoxycarbonyloxyethyl, 2- or 3-methoxycarbonyloxypropyl, 2-ethoxycarbonyloxyethyl, 2- or 3-ethoxycarbonyloxypropyl, 2-butoxycarbonyloxyethyl, 2- or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl, 2- or 3-(2-ethoxyethoxycarbonyloxy)propyl, 2-methoxyethyl, 2- or 3-methoxypropyl, 2-ethoxyethyl, 2- or 3-ethoxypropyl, 2-propoxyethyl, 2- or 3-propoxypropyl, 2-isopropoxyethyl, 2- or 3-isopropoxypropyl, 2-butoxyethyl, 2- or 3-butoxypropyl, 3,6-dioxaheptyl and 3,6-dioxaoctyl.

5. An indonaphthol dye as claimed in claim 1, wherein $R^5$ is selected from the group consisting of pyrazole, imidazole, oxazole, isoxazole, thiazole, isothiazole, 1,2,4-triazole, 1,2,4-oxadiazole, 1,3,4-oxadiazole, 1,2,4-thiadiazole and 1,3,4-thiadiazole.

6. An indonaphthol dye as claimed in claim 1, wherein $R^5$ is selected from the group consisting of

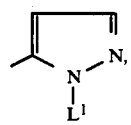

(IIa)

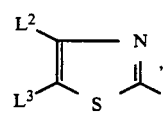

(IIb)

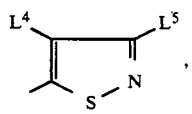

(IIc)

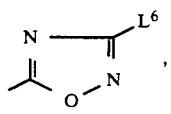

(IId)

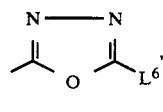

(IIe)

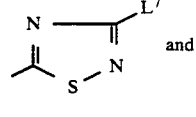

(IIf)

and

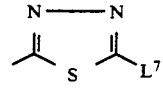

(IIg)

where $L^1$ is $C_1$-$C_8$-alkyl or cyclohexyl, $L^2$ is hydrogen, chlorine, $C_1$-$C_8$-alkyl, $C_1$-$C_8$-oxaalkyl, $C_1$-$C_8$-alkoxy or $C_1$-$C_8$-alkoxycarbonyl, where the alkyl group may be interrupted by 1 or 2 oxygen atoms in ether function, $L^3$ is hydrogen, $C_1$-$C_8$-alkyl, cyano, nitro or $C_1$-$C_8$-alkoxycarbonyl, where the alkyl group may be interrupted by 1 or 2 oxygen atoms in ether function, $L^4$ is hydrogen, chlorine, cyano, nitro or $C_1$-$C_8$-alkoxycarbonyl, where the alkyl group may be interrupted by 1 or 2 oxygen atoms in ether function, $L^5$ is chlorine, $C_1$–$C_8$-alkyl, $C_1$–$C_8$-oxaalkyl, $C_1$–$C_8$-alkoxy or $C_1$–$C_8$-alkylthio, $L^6$ is $C_1$–$C_8$-alkyl, and $L^7$ is hydrogen, chlorine, cyano, thiocyanato, $C_1$–$C_8$-alkyl, $C_1$–$C_8$-oxaalkyl, $C_1$–$C_8$-alkoxy, $C_1$–$C_8$-alkylthio, 2-($C_1$–$C_2$-alkoxycarbonyl)ethylthio or $C_1$–$C_8$-alkoxy-carbonyl, where the alkyl group may be interrupted by 1 or 2 oxygen atoms in ether function.

7. An indonaphthol dye as claimed in claim 1, having the structure:

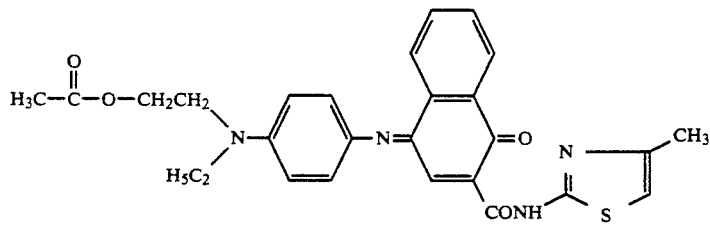

* * * * *